United States Patent [19]

Fuchigami

[11] 4,108,009

[45] Aug. 22, 1978

[54] VARIABLE-FORCE VIBRATOR

[75] Inventor: Masao Fuchigami, Kawasaki, Japan

[73] Assignee: Kabushiki Kaisha Komatsu Seisakusho, Tokyo, Japan

[21] Appl. No.: 709,646

[22] Filed: Jul. 29, 1976

[30] Foreign Application Priority Data

| | | | |
|---|---|---|---|
| Jul. 29, 1975 | [JP] | Japan | 50-104120[U] |
| Jul. 29, 1976 | [JP] | Japan | 51-104121[U] |

[51] Int. Cl.[2] ............ F16H 33/00

[52] U.S. Cl. ............ 74/61

[58] Field of Search ............ 74/61

[56] References Cited

U.S. PATENT DOCUMENTS

| | | | |
|---|---|---|---|
| 2,005,227 | 6/1935 | Johnson | 74/117 |
| 3,059,483 | 10/1962 | Clynch et al. | 74/61 |
| 3,498,601 | 3/1970 | Koval | 74/61 |
| 3,813,950 | 6/1974 | Ebersole | 74/61 |
| 3,896,677 | 7/1975 | Larson | 74/61 |

*Primary Examiner*—Benjamin W. Wyche
*Assistant Examiner*—Wesley S. Ratliff, Jr.
*Attorney, Agent, or Firm*—Armstrong, Nikaido, Marmelstein & Kubovcik

[57] ABSTRACT

A mechanical vibrator mounted within the roller of a vibratory compactor for dynamic soil compaction. The vibrator comprises a fixed eccentric weight and a movable eccentric weight mounted on a motor-driven hollow shaft. A reciprocable member arranged within the hollow shaft is connected to a fluid actuated cylinder to be thereby moved linearly relative to the shaft. This linear motion is translated into angular displacement of the movable weight on the hollow shaft, so that the angular position of the movable weight can be adjustably varied with respect to the fixed weight, resulting in the change in the vibratory force developed by the vibrator.

5 Claims, 7 Drawing Figures

VARIABLE-FORCE VIBRATOR

BACKGROUND OF THE INVENTION

This invention relates to mechanical vibrators and is directed more specifically to improvements in a vibrator of the type wherein the forces exciting the vibrations are generated by rotating unbalanced masses. The vibrator according to the invention is suitable for use, for example, in a vibratory compactor of the roll type which combines static weight with the dynamic force generated by the vibrator for compaction or densification of soils.

In a well known type of vibrator employed for vibratory roller compactors, vibrations are produced by rotation of eccentric mass about a fixed axis. The vibratory force developed by this type of vibrator can be defined as $$F = mr\omega^2$$

where F is the vibratory force, *m* is the mass, *r* is the eccentricity of the mass from the axis of rotation, and $\omega$ is the angular velocity.

For controlling the vibratory force and the frequency of vibrations independently of each other in this type of vibrator, the mass moment *mr* and the angular velocity $\omega$ must be controlled separately. If the mass moment *mr* is a constant, the vibratory force F will vary in proportion to $\omega^2$. In other words, the vibratory force will be determined in accordance with the frequency.

SUMMARY OF THE INVENTION

It is an object of this invention to provide a mechanical vibrator of the type described which includes means for adjustably varying the vibratory force developed thereby over a wide range.

Another object of the invention is to provide a variable-force vibrator suitable for use on the roll of a vibratory roller compactor, among other applications.

A further object of the invention is to provide a variable-force vibrator which, when incorporated in a vibratory compactor, will permit easy control thereof by the vehicle operator from his seat on the vehicle.

Stated in its simplest form, the invention provides a vibrator comprising a rotatable shaft, drive means for imparting rotation to the shaft, a first eccentric weight fixedly mounted on the shaft, a second eccentric weight rotatably mounted on the shaft, and means actuated by a fluid actuated cylinder for adjustably varying the angular position of the second eccentric weight on the shaft with respect to the first eccentric weight.

By the change in the angular position of the second eccentric weight on the rotatable shaft with respect to the fixed first eccentric weight, the eccentric mass moment on the shaft can be continuously varied, resulting in the corresponding change in the vibratory force developed by the vibrator at a given angular velocity. It should be appreciated that such a change in the vibratory force can be effected merely by selectively supplying fluid pressure to the opposed fluid chambers of the cylinder.

The above and other objects, features and advantages of this invention and the manner of attaining them will become more clearly apparent, and the invention itself will best be understood, upon consideration of the following description which is to be read in connection with the accompanying drawings showing specific embodiments of the invention.

DESCRIPTION OF THE PREFERRED EMBODIMENTS

The variable-force vibrator according to this invention is hereinafter described more specifically as adapted for a self-propelled vibratory roller compactor illustrated in FIG. 1. The vibratory compactor comprises a roll 10 in the shape of a hollow cylinder arranged between and operatively connected via the usual vibration isolators, not shown, to a pair of push arms 11 which in turn is pivotally connected to a two-wheeled powered vehicle 12. The roll 10 is internally furnished with the vibrator for dynamic compaction of soils.

Figure 2:
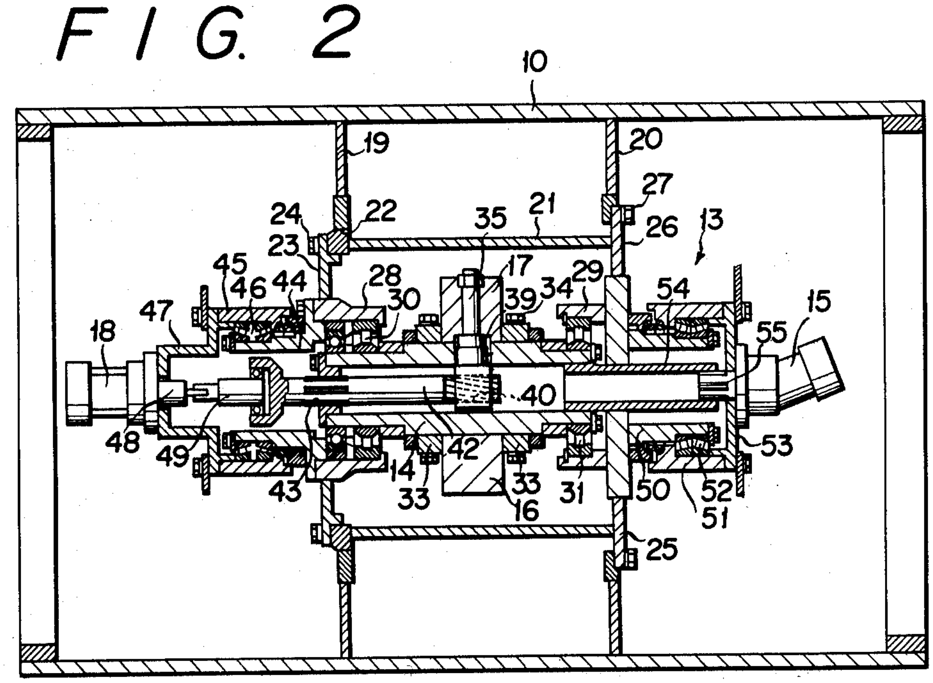
FIG. 2 is an enlarged axial sectional view of the roll of the vibratory compactor shown in FIG. 1, the roll having mounted therein a preferred form of the vibrator according to the invention.

FIG. 2 illustrates a first preferred form of the variable-force vibrator, generally designated 13, that is housed in the roll 10 of the vibratory compactor. The vibrator 13 broadly comprises a hollow shaft 14 rotatably supported in substantially coaxial relationship to the roll 10, a drive motor 15 for imparting rotation to the hollow shaft, a fixed eccentric weight 16 securely mounted on the hollow shaft approximately midway between its opposite ends, a movable eccentric weight 17 rotatably mounted on the hollow shaft for angular displacement within limits relative to the fixed weight, and a fluid actuated cylinder 18 for causing such angular displacement of the moveable weight.

The roll 10 has a pair of spaced-apart annular ribs 19 and 20 formed on its inside surface for installation of a support structure 21 in the form of a hollow cylinder in position therein. The support structure 21 has its left hand end, as seen in FIG. 1, flanged at 22 and tightly fitted in the left hand rib 19. This left hand end of the support structure is openably closed by an annular end plate 23, which is bolted or otherwise fastened at 24 to the flange 22. The right hand end of the support structure is unopenably closed by an end plate 25. This right hand end plate 25 projects beyond the circumference of the support structure to provide a flange 26 which is bolted at 27 to the right hand rib 20. The support structure 21 is thus mounted in substantially coaxial relationship to the roll 10.

A short sleeve 28 is securely fitted in the annular left hand end plate 23 of the support structure 21, and another short sleeve 29 is affixed to the inside surface of the right hand end plate 25 of the support structure so as to be in coaxial relationship to the sleeve 28. The hollow shaft 14 extends between these coaxial sleeves 28 and 29 and is thereby rotatably supported via bearings 30 and 31.

Figure 3:
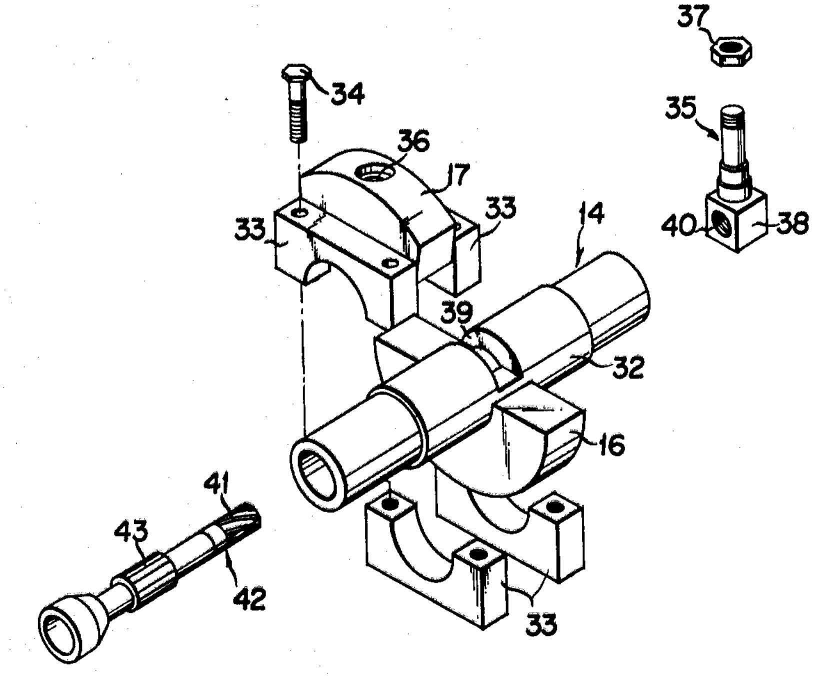
FIG. 3 is an enlarged, exploded perspective view showing some essential parts of the vibrator of FIG. 2.

As will be seen also from FIG. 3, the hollow shaft 14 has a mid-portion 32 of increased diameter, and the fixed eccentric weight 16 which is shown to be sectorial or semicircular in shape is mounted on this mid-portion of the hollow shaft. Also fixedly mounted on the mid-portion of the hollow shaft are a pair of axially spaced guides 33 which are located on opposite sides of the fixed weight 16 and each of which consists of halves clamped together by bolting 34.

The movable eccentric weight 17 is slidably received between the pair of guides 33 for angular displacement around the hollow shaft 14 with respect to the fixed weight 16. Also shown to be sectorial in shape, the movable weight 17 is less in mass than the fixed weight 16.

For causing such angular displacement of the movable weight 17, a connector pin 35 is inserted into and through a hole 36 in the movable weight and is secured thereto by a nut 37 fitted over the threaded outer end of the pin. At its inner end the connector pin 35 terminates in a cubic head 38 which projects into the interior of the hollow shaft 14 through a slot 39 formed circumferentially therein through a desired angle. This head of the connector pin has a tapped hole 40 formed therethrough so as to extend axially of the hollow shaft 14.

Received in the tapped hole 40 of the connector pin head 38 is an externally screw threaded end 41 of an actuator rod or shaft 42 which is accommodated coaxially within the hollow shaft 14 and which is splined thereto at 43 so as to be rotatable simultaneously therewith but reciprocally movable axially relative to same. The actuator rod 42 is connected to the fluid actuated cylinder 18 through means hereinafter described and is thereby moved linearly relative to the hollow shaft 14. Such linear motion of the actuator rod is translated into the desired rotary motion of the movable weight 17 about the axis of the hollow shaft through the external thread on the end 41 of the rod and the internal thread in the hole 40 of the connector pin head 38. It will be noted that the actuator rod 42 serves also to hold the movable weight 17 on the hollow shaft 14 via the connector pin 35.

A short sleeve 44 is fastened, as by bolting, to the left hand end plate 23 of the support structure 21, or to the aforesaid sleeve 28, and an additional short sleeve 45 is rotatably fitted over the sleeve 44 via a bearing 46. Secured to the rotatable sleeve 45 is a mounting member 47 on which there is mounted the cylinder 18, preferably of the type actuated hydraulically. The piston rod 48 of this cylinder is jointed to a connector rod 49 which in turn is connected to the actuator rod 42 so as to be rotatable relative to same.

Secured to the outside surface of the right hand end plate 25 of the support structure 21 is a short sleeve 50 over which there is rotatably fitted another sleeve 51 via a bearing 52. A mounting plate 53 is secured to the rotatable sleeve 51, and the drive motor 15 is mounted on this mounting plate.

For transmission of motor rotation to the hollow shaft 14, a hollow connector shaft 54 rotatably extends through the right hand end plate 25 of the support structure. The left hand end of this connector shaft is snugly fitted in the hollow shaft 14. The output shaft 55 of the drive motor 15 is received in the right hand end of the connector shaft 54 and is splinedly connected thereto.

Thus, upon setting the drive motor 15 in motion, the hollow shaft 14 with the fixed and the movable weights 16 and 17 thereon is rotated via the connector shaft 54. The rotation of these unbalanced masses excites vibrations which are transmitted to the roll 10 of the vibratory compactor shown in FIG. 1. A soil can therefore be compacted by the vibrating roll 10 as the latter is rolled thereover with the travel of the vehicle.

For changing the vibratory force developed by the vibrator 13, hydraulic fluid pressure may be selectively supplied to either the head end or the rod end fluid chamber of the cylinder 18. Upon consequent extension or contraction of the cylinder piston rod 48, the actuator rod 42 within the hollow shaft 14 is moved back or forth in its axial direction. Such linear motion of the actuator rod 42 is directly translated as aforesaid into the controlled rotary motion of the connector pin 35 and therefore of the movable weight 17 with respect to the fixed weight 16. The total mass moment on the hollow shaft 14 can thus be adjustably varied over a wide range, so that the vibratory force developed by the vibrator can be changed correspondingly.

Preferably, means should be provided whereby the vehicle operator is enabled to control the operation of the hydraulic cylinder 18 from his seat on the vehicle. It is considered easy for the specialists to devise such control means together with the necessary piping and valving.

Second Form

In an alternate embodiment of this invention shown in FIGS. 4 through 7, various parts of the vibrator are identified by the same reference numerals as those used to identify the corresponding parts, if any of the preceding embodiment, but with the digit "1" prefixed to such numerals.

Thus, the modified variable-force vibrator 113 comprises a hollow shaft 114, a drive motor 115 for imparting rotation to the hollow shaft, a fixed eccentric weight 116 securely mounted on the hollow shaft, a movable eccentric weight 117 mounted on the hollow shaft for angular displacement with respect to the fixed weight, and a fluid actuated cylinder 118 for causing such angular displacement of the movable weight.

Figure 1:
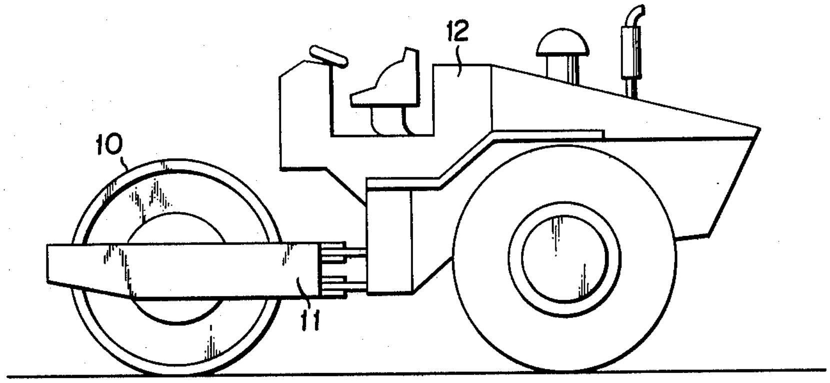
FIG. 1 is a side elevational view of a self-propelled vibratory compactor of the roll type to which the vibrator according to this invention is applicable to advantage.

This vibrator 113 is also mounted within the roll 10 of the vibratory compactor illustrated in FIG. 1. The roll 10 has a pair of spaced-apart annular ribs 119 and 120 formed on its inside surface. A pair of disc-like support members 123 and 125 are bolted or otherwise fastened at 124 and 127 to the annular ribs 119 and 120, respectively. A pair of short sleeves 128 and 129 are formed integral with the respective support members 123 and 125 in axial alignment with each other. The hollow shaft 114 extends between these short sleeves 128 and 129 and is thereby rotatably supported via bearings 130 and 131.

Figure 5:
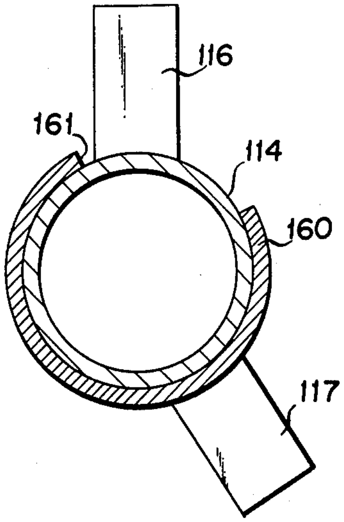
FIG. 5 is a sectional view taken along the line 5—5 of FIG. 4.
Figure 6:
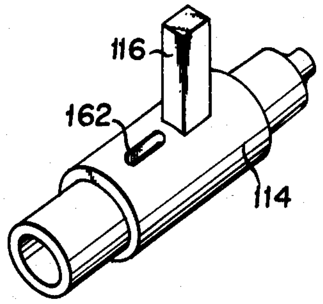
FIG. 6 is a perspective view of a hollow shaft together with a fixed eccentric weight mounted thereon in the vibrator of FIG. 4.
Figure 7:
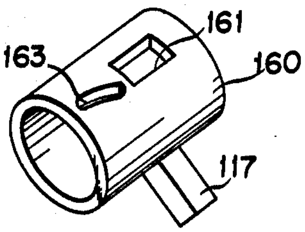
FIG. 7 is a perspective view of a sleeve together with a movable weight mounted thereon in the vibrator of FIG. 4.

As shown also in FIGS. 5 through 7, the fixed eccentric weight 116 which is shown to be rectangular in shape is mounted on the hollow shaft 114. A sleeve 160 having the movable eccentric weight 117 fixedly mounted thereon is slidably fitted over the hollow shaft 114. This sleeve 160 has a relatively large rectangular opening 161 for receiving the fixed weight 116, with such clearance that the sleeve is rotatable relative to the hollow shaft 114 within limits.

Figure 4:
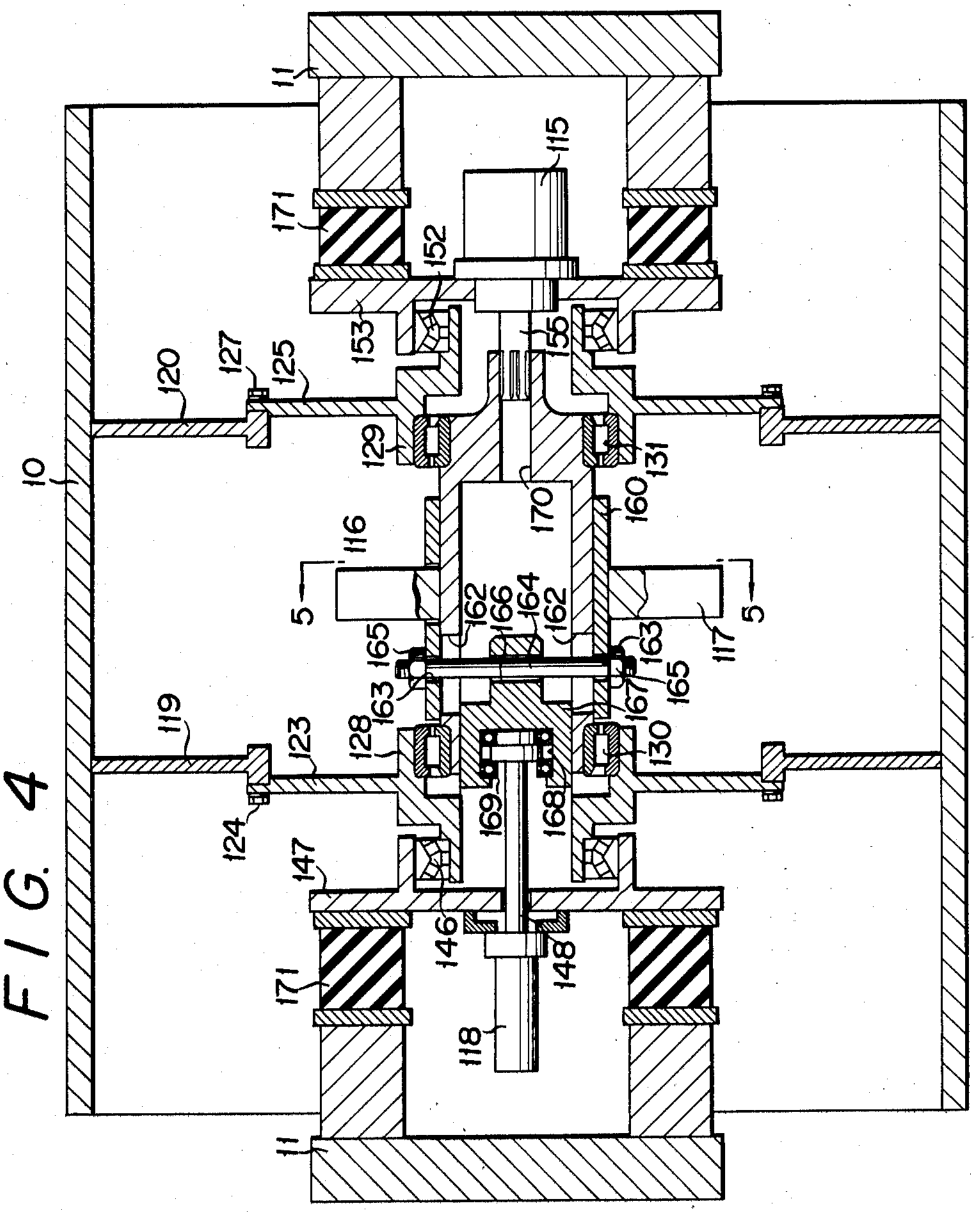
FIG. 4 is a view similar to FIG. 2 except that the compactor roll has mounted therein another preferred form of the vibrator according to the invention.

It will be observed from a consideration of FIGS. 4 and 6 that the hollow shaft 114 has formed therein a pair of diametrically opposed slots 162 of equal length extending in its axial direction. As will further be noted from FIGS. 4 and 7, the sleeve 160 has formed therein a pair of diametrically opposed slots 163 of equal length extending at an angle to its axis. The first mentioned pair of slots 162 will hereinafter be referred to as the axial slots, and the second mentioned pair of slots 163 as the bias slots. The bias slots 163 are disposed partly in register with the respective axial slots 162 when the sleeve 160 is mounted in position on the hollow shaft 114.

Slidably received in these axial and bias slots 162 and 163, and arranged diametrically of the hollow shaft 114, is an actuator pin 164 which is retained in position by a pair of nuts 165 fitted over its threaded opposite ends. The actuator pin 164 extends through a hole 166 in a slide 167 slidably fitted in the hollow shaft 114. Connected to the fluid actuated cylinder 118 as hereinafter described, the slide 167 is thereby moved linearly back and forth relative to the hollow shaft 114. The consequent linear motion of the actuator pin 164 along the axial slots 162 is translated into the rotary motion of the sleeve 160, and therefore of the movable weight 117 thereon, as the actuator pin slides along the bias slots 163.

A mounting plate 147 is rotatably connected to the left hand support member 123 via a bearing 146, and the cylinder 118 is fixedly mounted on this mounting plate. The piston rod 148 of this cylinder, extending through the mounting plate, has its flanged end received in a hole 168 of the slide 167 and rotatably connected thereto via a bearing 169.

Another similar mounting plate 153 is also rotatably connected to the right hand support member 125 via a bearing 152, and the drive motor 115 is fixedly mounted on this mounting plate. The output shaft 155 of the drive motor is splinedly fitted in a constricted axial bore 170 at the right hand end of the hollow shaft 114.

The mounting plates 147 and 153 are connected via the vibration isolators 171 to the pair of push arms 11, respectively. These push arms are of course connected to the two-wheeled powered vehicle 12 as shown in FIG. 1.

In operation, the rotation of the drive motor 115 is imparted directly to the hollow shaft 114, causing same to rotate with the fixed and the movable weights 116 and 117 thereon. The rotation of these unbalanced masses excites vibrations which are transmitted to the roll 10 via the pair of support members 123 and 125 and the pair of annular ribs 119 and 120.

For changing the vibratory force developed by this vibrator 113, fluid pressure may be selectively supplied to the head end and the rod end chambers of the cylinder 118 as in the preceding embodiment. Upon consequent extension or contraction of its piston rod 148, the slide 167 within the hollow shaft 114 slides back or forth in its axial direction. Such linear motion of the slide is directed translated as above explained into the controlled rotary motion of the sleeve 160 and therefore of the movable weight 117 with respect to the fixed weight 116. The vibratory force developed by the vibrator 113 can thus be varied over a wide range in accordance with the change in the total mass moment on the hollow shaft.

While the vibrator in accordance with this invention has been shown and described in terms of its specific forms, it is understood that the invention itself is not to be restricted by the exact details of this disclosure. Numerous modifications or changes will readily occur to those skilled in the art without departing from the spirit or scope of the invention as sought to be defined by the following claims.

What is claimed is:

1. In a vibrator, the combination of a rotatable hollow shaft, drive means for imparting rotation to said hollow shaft, a first eccentric weight fixedly mounted on said hollow shaft, a second eccentric weight rotatably mounted on said hollow shaft, reciprocating means mounted within said hollow shaft for movement in its axial direction, a fluid actuated cylinder for linearly moving said reciprocating means relative to said hollow shaft, and means interconnecting said second eccentric weight with said reciprocating means for directly translating the linear motion of said reciprocating means into controlled rotary motion of said second eccentric weight relative to said hollow shaft, whereby the angular position of said second eccentric weight on said hollow shaft can be adjustably varied with respect to said first eccentric weight for correspondingly changing the vibratory force developed by the vibrator.

2. In a vibrator, the combination of a rotatable hollow shaft, drive means for imparting rotation to said hollow shaft, a first eccentric weight fixedly mounted on said hollow shaft, a second eccentric weight rotatably mounted on said hollow shaft, an actuator rod mounted within said hollow shaft for reciprocal movement in its axial direction, a fluid actuated cylinder for linearly moving said actuator rod relative to said hollow shaft, a connector member extending through an opening formed in said hollow shaft for connecting said second eccentric weight to said actuator rod, said connector member being adapted to screw-threadedly engage said actuator rod so as to be rotated about said actuator rod upon linear motion of said actuator rod relative to said hollow shaft, whereby the angular position of said second eccentric weight on said hollow shaft can be adjustably varied with respect to said first eccentric weight for correspondingly changing the vibratory force developed by the vibrator.

3. The vibrator as recited in claim 2, wherein said actuator rod is at least partly externally screw threaded, and wherein said connector member has an internally screw threaded hole for receiving the externally threaded portion of said actuator rod.

4. In a vibrator, the combination of a rotatable hollow shaft, drive means for imparting rotation to said hollow shaft, a first eccentric weight fixedly mounted on said hollow shaft, a sleeve rotatably fitted over said hollow shaft, a second eccentric weight fixedly mounted on said sleeve, a slide slidably mounted within said hollow shaft for reciprocal movement in its axial direction, a fluid actuated cylinder for linearly moving said slide relative to said hollow shaft, and means interconnecting said second eccentric weight with said reciprocating means for directly translating the linear motion of said slide into controlled rotary motion of said sleeve relative to said hollow shaft, whereby the angular position of said second eccentric weight on said hollow shaft can be adjustably varied with respect to said first eccentric weight for correspondingly changing the vibratory force developed by the vibrator.

5. The vibrator as recited in claim 4, wherein said hollow shaft has at least one slot extending in its axial direction, wherein said sleeve has at least one slot extending at an angle to its axial direction, and wherein said translating means includes an actuator pin carried by said slide and slidably extending through said slots in said hollow shaft and said sleeve, said sleeve being rotated relative to said hollow shaft upon movement of said actuator pin along said slots.

* * * * *